United States Patent [19]

Drent

[11] Patent Number: 4,841,020

[45] Date of Patent: Jun. 20, 1989

[54] CATALYTIC POLYMERIZATION OF CARBON MONOXIDE WITH FUNCTIONAL SUBSTITUTED ETHYLENICALLY UNSATURATED MONOMER

[75] Inventor: Eit Drent, Amsterdam, Netherlands

[73] Assignee: Shell Oil Company, Houston, Tex.

[21] Appl. No.: 98,652

[22] Filed: Sep. 21, 1987

[30] Foreign Application Priority Data

Nov. 27, 1986 [NL] Netherlands ............... 8603015

[51] Int. Cl.[4] ............................................. C08G 67/02
[52] U.S. Cl. ..................................... 528/392; 528/220; 528/222; 528/223; 528/224; 528/225; 528/235; 528/242; 528/243; 528/271
[58] Field of Search ..................... 528/392, 271

[56] References Cited

U.S. PATENT DOCUMENTS

| | | | |
|---|---|---|---|
| 2,495,286 | 1/1950 | Brubaker | 260/63 |
| 3,689,460 | 9/1972 | Nozaki | 260/63 |
| 3,780,140 | 12/1973 | Hammer | 260/884 |
| 4,543,440 | 9/1985 | Loomis | 525/539 |

FOREIGN PATENT DOCUMENTS

| | | |
|---|---|---|
| 1081304 | 8/1967 | European Pat. Off. . |
| 0121965 | 10/1984 | European Pat. Off. . |
| 0181014 | 5/1986 | European Pat. Off. . |
| 0213671 | 3/1987 | European Pat. Off. . |
| 0227135 | 7/1987 | European Pat. Off. . |
| 229408 | 7/1987 | European Pat. Off. . |

OTHER PUBLICATIONS

Kirk-Othmer, Encyclopedia of Chemical Technology, 2nd. Ed., vol. 12, 1967, pp. 132–133.

*Primary Examiner*—Harold D. Anderson
*Attorney, Agent, or Firm*—Dean F. Vance

[57] ABSTRACT

Novel copolymers and terpolymers are produced from carbon monoxide, a functionally-substituted ethylenically unsaturated compound wherein the functional substituent is separated from the ethylenic unsaturation by a divalent bridging group of at least one carbon, and optionally an ethylenically unsaturated hydrocarbon. The polymerization is conducted under polymerization conditions in the presence of a catalyst composition formed from a palladium compound, the anion of a non-hydrohalogenic acid having a pKa less than about 6 and a bidentate ligand of phosphorus or of nitrogen.

13 Claims, No Drawings

CATALYTIC POLYMERIZATION OF CARBON MONOXIDE WITH FUNCTIONAL SUBSTITUTED ETHYLENICALLY UNSATURATED MONOMER

This invention relates to a process of producing linear alternating polymers of carbon monoxide and certain functionally substituted ethylenically unsaturated compounds. More particularly, the invention relates to a process of producing copolymers of carbon monoxide and certain functionally substituted ethylenically unsaturated compounds as well as terpolymers additionally containing ethylenically unsaturated hydrocarbon. The invention also relates to the novel polymers thereby produced.

BACKGROUND OF THE INVENTION

Polymers containing units of carbon monoxide and one or more ethylenically unsaturated hydrocarbon are known in the art. Brubaker, U.S. Pat. No. 2,495,286, prepares such polymers of relatively low carbon monoxide content through the use of free radical catalysts, e.g., peroxy compounds. British Pat. No. 1,081,304 prepares polymers of higher carbon monoxide content in the presence of alkylphosphine complexes of palladium. Nozaki extended the scope of the reaction to include arylphosphine complexes of palladium halides, U.S. Pat. No. 3,694,412, and disclosed the use of unsaturated compounds other than hydrocarbons, e.g., vinyl acetate. A number of other references teach production of random copolymers or terpolymers of carbon monoxide and ethylenically unsaturated hdyrocarbons and non-hydrocarbons such as vinyl acetate or methyl acrylate. See, for example, U.S. Pat. No. 3,948,832. Published European application 0,121,965 published Oct. 10, 1984 teaches production of polymers in the presence of catalyst compositions formed from a palladium compound, an anion of a non-hydrohalogenic acid having a pKa less than 2 and bidentate phosphine ligands. Copending U.S. application, Ser. No. 935,431, filed Nov. 26, 1986, shows a similar catalyst composition incorporating bidentate nitrogen ligands.

When these references employ non-hydrocarbyl ethylenically unsaturated monomers in the production of polyketones, the unsaturated compounds have a functional group attached directly to a carbon atom of the ethylenic unsaturation through which the polymerization takes place, for example, vinyl acetate and methyl acrylate. Possible exceptions are shown by Nozaki, U.S. Pat. No. 3,835,123 and related patents where vinyl esters of unsaturated esters are listed as suitable monomers for the production of terpolymers with carbon monoxide and unsaturated hydrocarbon. The listed vinyl esters of unsaturated acids are vinyl crotonate and vinyl hexenoate. It is not exactly clear as to which of the unsaturated linkages serves as the site for polymerization, although the general teaching would suggest polymerization through the vinyl group rather than the unsaturation of the acid moiety.

Polymers of carbon monoxide and ethylenically unsaturated compounds, particularly when the polymers are linear alternating polymers of approximately equimolar quantities of carbon monoxide and unsaturate, are known as polyketones. These compounds contain carbonyl groups at regular intervals along the polymer chain. The polyketones have established utility as premium thermoplastics in a number of applications. Additionally, the properties of the polymers are modified by chemical reaction through the carbonyl groups. For example, catalytic reduction of the carbonyl groups followed by dehydration results in the presence of unsaturation in the polymer chain. Catalytic reduction in the presence of ammonia or hydrogen sulfide leads to the production of the polyamines or polythiols, respectively. This opportunity of modifying chemical structure and the resulting properties is an aspect of the utility of the polyketones. Other functional sites are provided by employing a functionally-substituted ethylenically unsaturated monomer as a component of the polymer chain. When an ethylenically unsubstituted compound having a functional group attached to a carbon atom of the ethylenic unsaturation is employed, the resulting polymer has other functional groups in addition to carbonyl attached to the polymer chain. For example, use of methyl acrylate as a comonomer results in the production of a polymer chain to which carbomethoxy groups are directly attached. Thus, use of ethylenically unsaturated compounds having various functional groups as a substituent on a carbon atom of the ethylenic unsaturation leads to polymers with a variety of functional groups attached to a carbon atom of the polymer chain. Such unsaturates are useful as components of terpolymers but on many occasions, copolymers with carbon monoxide are not easily produced and in some instances are not produced at all.

It would be of advantage to provide a process which employs functionally-substituted ethylenically unsaturated compounds wherein the functional group is not attached to a carbon atom of the ethylenic unsaturation. Use of such functionally-substituted ethylenic compounds permits the production of novel copolymers with carbon monoxide which contain functional groups not attached directly to the polymer chain as well as similar novel terpolymers which additionally contain moieties of ethylenically unsaturated hydrocarbon.

SUMMARY OF THE INVENTION

The present invention relates to a process for the production of linear alternating polymers incorporating moieties of carbon monoxide and a functionally substituted ethylenically unsaturated compound wherein the functional group and the ethylenic unsaturation are separated by a divalent bridging group of one carbon atom. More particularly, the invention relates to a process of producing linear alternating copolymers of carbon monoxide and such functionally substituted ethylenic compounds as well as linear alternating terpolymers additionally containing moieties of ethylenically unsaturated hydrocarbon.

The process is conducted by contacting the monomers under polymerization conditions in the presence of a catalyst composition formed from a palladium compound, an anion of a non-hydrohalogenic acid having a pKa below about 6 and certain bidentate ligands of phosphorus or nitrogen. The invention also relates to the novel polymers and terpolymers thereby produced.

DESCRIPTION OF THE INVENTION

The palladium compound employed in the catalyst of the invention is the palladium salt of an organic acid, preferably a palladium salt of an organic carboxylic acid of up to 10 carbon atoms and up to 2 carboxyl groups. Although palladium salts of alkanoic acids such as palladium propionate and palladium octanoate are suitable in the catalyst composition of the invention, largely for reasons of availability the preferred palladium salt is palladium acetate.

The anion employed in the catalyst composition of the invention is the anion of a non-hydrohalogenic acid having a pKa less than about 6, preferably less than about 2, as measured in water at 18° C. Preferred anions are anions of oxygen-containing acids including anions of inorganic acids such as sulfuric acid, perchloric acid, phosphoric acid and nitrous acid or anions of organic acids including anions of carboxylic acids such as trichloroacetic acid, trifluoracetic acid, difluoroacetic acid, tartaric acid and 2.5-dihydroxybenzoic acid as well as anoions of organic sulfonic acids such as paratoluenesulfonic acid, methanesulfonic acid, 2-hydroxypropane-2-sulfonic acid and trifluoromethanesulfonic acid. Anions of trifluoracetic acid and p-toluenesulfonic acid consitute a preferred class of anions for inclusion within the catalyst compositions of the invention.

The anion is provided in the form of the acid per se or alternatively is provided in the form of a salt. Where the anion is provided as a salt, metal salts wherein the metal is a transition metal of Groups IB through VIIB of the Periodic Table of Elements are suitable. When a transition metal salt is provided as the source of the anion, salts of copper are particularly useful. In yet another modification, the palladium compound and the anion are provided at least partially as a single compound, e.g., palladium p-tosylate (i.e., p-toluenesulfonate).

The anion is provided in a quantity of from about 0.5 equivalent to about 200 equivalents per gram atom of palladium (as the compound), but preferably from about 1 equivalent to about 100 equivalents per gram atom of palladium.

The bidentate ligand to be employed in the catalyst compositions of the invention is a bidentatate ligand of phosphorus or a bidentate ligand of nitrogen. In the case of bidentate phosphorus ligand, suitable ligands are represented by the formula

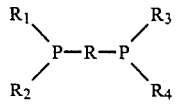

wherein $R_1$, $R_2$, $R_3$, and $R_4$ independently have from 6 to 20 carbon atoms inclusive, preferably from 6 to 10 carbon atoms inclusive, and are aryl including alkaryl or alkoxyaryl. Illustrative of such groups are phenyl, totyl, 4-ethylphenyl, 2,4-dimethylphenyl, 4-methoxyphenyl, 2-methoxyphenyl and 3-propoxyphenyl. In one preferred embodiment, each of $R_1$, $R_2$, $R_3$ and $R_4$ is the same group and furthermore is substituted with an alkoxy substituent in a position ortho to the phosphorus to which the group is attached. The group R is a divalent hydrocarbyl bridging group of from 2 to 20 carbon atoms inclusive, preferably 2 to 10 carbon atoms inclusive, with from 2 to 4 carbon atoms in the phosphorus-phosphorus bridge. The preferred R group is the trimethylene group, i.e., $-CH_2-CH_2-CH_2-$.

Examples of suitable bidentate phosphorus ligands are 1,3-bis(diphenylphosphino)propane, 1,3-bis(di-p-tolylphosphino)propane, 1,3-bis[di(p-methoxyphenyl)phosphino]propane, 1,3-bis[di(2,4-dimethyoxyphenyl)phosphino]propane, and 1,3-bis[tri(2,4,6-ethoxyphenyl)phosphino]propane. The preferred bidentate ligand is 1,3-bis(diphenylphosphino)propane.

When a bidentate phosphorus ligand is employed in the catalyst compositions of the invention, quantities from about 0.1 mol to about 5 mol per gram atom of palladium are satisfactory with quantities from about 0.5 mol to about 1.5 mol per gram atom of palladium being preferred.

The bidentate nitrogen ligands of the catalyst compositions of the invention are ligands of the formula

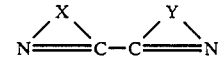

wherein X and Y independently are divalent bridging groups of from 2 to 10 carbon atoms inclusive and up to 2 nitrogen atoms with from 3 to 4 atoms in the bridge, at least two of which are carbon and any other atoms in the bridge being nitrogen atoms. Illustrative of such bidentate ligands are the 2,2'-bipyridines, the 1,10-phenanthrolines, the 2,2'-biquinilones, the 2-(2-pyridyl)-benzimidazolines and the 3-(2-pyridyl)-5,6-diphenyl-1,2,4-triazines.

The preferred class of bidentate nitrogen ligands are 2,2'-bipyridines wherein the ring carbon atoms are substituted (except with hydrogen) or are substituted with alkyl groups, e.g., lower alkyl groups of from 1 to 4 carbon atoms such as methyl, ethyl or butyl, with halo substituents, particularly chloro, or with alkoxy wherein the alkyl moiety is lower alkyl. Substitution of the pyridine rings, when present, is suitably symmetrical or unsymmetrical.

Illustrative 2,2'-bipyridines are 2,2'-bipyridine, 4,4'-dimethyl2,2'-bipyridine, 4,4'-dichloro-2,2'-bipyridine and 4,4'-dimethoxy-2,2'-bipyridine. Particularly preferred as the bidentate nitrogen ligand is 2,2'-bipyridine.

When bidentate nitrogen ligands are employed, quantities of ligand from abou 0.5 mol to about 200 mol gram atom of palladium compound are satisfactory with quantities form about 1 mol to about 50 moles per gram atom of palladium being preferred.

Although not required, it is useful on occasion to add a quinone as an additional catalyst component which serves to enhance catalyst activity. Suitable quinones are quinones of from 6 to 15 carbon atoms inclusive and are benzoquinones, naphthaquinones or anthraquinones. Preferred quinones are benzoquinones, particulary 1,4-benzoquinone. As stated, the presence of a quinone is not required but when employed amounts of quinone up to about 10,000 mol per gram atom of palladium are satisfactory with amounts up to about 5000 mol per gram atom of palladium being preferred.

The polymers of the invention are copolymers of carbon monoxide and a functionally substituted ethylenically unsaturated compound wherein the functional group is separated from the ethylenic unsaturation by a divalent bridging group of at least one carbon atom, as well as terpolymers additionally incorporating in the polymer chain moieties of an ethylenically unsaturated hyrdocarbon.

The functionally substituted ethylenic compound employed in the polymers of the invention is an Ω-substituted vinyl compound of up to 20 carbon atoms, preferably up to 12 carbon atoms, with at least one carbon atom separating the functional group and the vinyl, i.e., $-CH=CH_2$, moiety. Functional groups suitably employed in the Ω-substituted vinyl compound are hydroxyl, alkoxy, acyl, formyl, carboxyl, cabroalkoxy, amido, phosphonato, cyano and halo.

The functionally substituted ethylenic compound is preferably an otherwise hydrocarbon mono-functional compound such as that represented by the formula $$CH_2=CH-(CH_2)_n-Z \qquad I$$

wherein n is an integer of at least 1. Within formula I, the term Z represents the functional group and is selected from $-OR_5$, $-COR_5$, $-COOR_5$, $-OCOR_5$, $-CONR_5R_6$, $-NR_5COR_6$, $-OPO(R_6)_2$, $-PO(OR_4)_2$, $-CN$ and $-Hal$ where Hal represents halogen, particulary chloro, $R_5$ represents hydrogen or lower alkyl of from 1 to 4 carbon atoms and $R_6$ is lower alkyl of from 1 to 4 carbon atoms.

Illustrative functionally substituted ethylenic compounds include alcohols such as 10-undecenyl alcohol, ethers such as methyl 7-octenyl ether, aldehydes such as 3-butenal and 4-butenal, ketones such as ethyl 4-pentenyl ketone, esters such as methyl 10-undecenoate, allyl acetate an 7-octenyl acetate, amides such as 4-N,N-dimethylamido)butene, and N-(3-butenyl)acetamide, phosphonates such as 0-methyl-0'-allyl-methylphosphonate and 0,0'-dimethyl-(3-butene)phosphonate, nitriles such as 6-cyanohexene-1 and 9-cyanononene-1 and halo compounds such as 5-chloropentene-1 and 6-chlorohexene-1. Preferred functionally substituted ethylenic compounds are those Ω-substituted vinyl compounds wherein the substituent is hydroxy, carboxy, carbalkoxy wherein the alkyl moiety is alkyl of 1 to 4 carbon atoms, acyl of 2 to 5 carbon atoms and chloro.

The copolymers of the present invention are therefore linear alternating polymers of carbon monoxide and the functionally substituted ethylenic compound. In terms of the above formula I, the copolymers are composed of units of the formula $$\begin{matrix} O \\ \| \\ -C-D- \end{matrix} \qquad II$$

wherein D represents a moiety of the compound of formula I polymerized through the ethylenic unsaturation.

In the modifications of the polymers of the invention wherein terpolymres are desired, the polymers will additionally contain moieties of ethylenically unsaturated hydrocarbon. Preferred ethylenically unsaturated hydrocarbons have up to 15 carbon atoms, preferably of up to 8 carbon atoms, and are α-olefins as illustrated by ethylene, propylene, butene-1, octene-1 and docecene-1. The preferred α-olefins are ethylene and propylene, particularly ethylene.

The terpolymers of the invention are therefor linear alternating polymers of carbon monoxide and unsaturated compound represented by the formula $$-\left[\begin{matrix} O \\ \| \\ C-A \end{matrix}\right]_x \left[\begin{matrix} O \\ \| \\ C-D \end{matrix}\right]_y- \qquad III$$

wherein D has the previously stated significance, A is the moiety of the ethylenically unsaturated hydrocarbon polymerized through the ethylenic unsaturation and x and y represent the relative number of $$\begin{matrix} O \\ \| \\ -C-A- \end{matrix} \text{ units and } \begin{matrix} O \\ \| \\ -C-D- \end{matrix} \text{ units}$$

which occur randomly throughout the polymer chain. When x is O, the formula III becomes essentially identical to formula II and represents copolymer. In the case of polymers broadly, ratios of x to y up to about 80:1 are suitable with ratios from about 10:1 to about 60:1 being preferred.

Polymerization is conducted by contacting the carbon monoxide and ethylenically unsaturated compounds in the presence of the catalyst composition under polymerization conditions. In general, molar ratios of total ethylenically unsaturated compound to carbon dioxide from about 10:1 to about 1:5 are suitable with molar ratios from about 5:1 to about 1:3 being preferred. The catalyst composition is employed in catalytic quantities. Amounts of catalyst composition sufficient to provide from about $1\times10^{-7}$ to about $1\times10^{-3}$ gram atom of palladium per mol of ethylenically unsaturated compound are satisfactory while amounts sufficient to provide from about $1\times10^{-6}$ to about $1\times10^{-4}$ gram atom of palladium per mol of ethylenically unsaturated compound are preferred.

The monomers and catalyst composition are contacted under polymerization conditions. The method of contacting is not critical and conventional methods such as shaking or stirring are suitable. The contacting is preferably brought about in the liquid phase in the presence of an inert diluent such as a lower alkanol, e.g., methanol or ethanol. Suitable reaction temperatures vary from about 20° C. to about 200° C. with the temperature range from about 30° C. to about 105° C. being preferred. Typical reaction pressures are from about 1 bar to about 200 bar, preferably form about 20 bar to about 100 bar. Subsequent to reaction, the polymer product is recovered by conventional means such as filtration, decantation or evaporation. The product will on occasion contain residues of the catalyst which are removed, if desired, by treatment with a solvent which is selective for the residues.

The polyketone polymers are thermoplastics of accepted utility. They are cast or injection molded into plaques or blanks from which containers are formed by drawing or pressure forming. By related techniques the polymers are formed into shaped parts for use in the automotive industry. The polymers are converted into cables by known techniques or into large articles for use in construction. In addition, of course, the presence of a variety of functional groups attached by bridging groups to the polymer chain make possible an even greater number of polymeric products of modified utility through chemical conversion of the functional groups. For example, hydrolysis of an ester functional group leads to alcohols or carboxylic acid derivatives, depending upon the configuration of the ester used. Hydrolysis of a cyano functional group results in the production of amides or amines, depending upon the extent of hydrolysis. Saponification of a phosphonate functional group results in production of alcohols or phosphoric acids, depending upon the configuration of the phosphonate group. Other derivatives will be apparent.

The invention is further illustrated, but not limited, by the following Comparative Experiments (not of the invention) and Illustrative Embodiments.

COMPARATIVE EXAMPLE I

A stirred autoclave of 250 ml capacity was charged with a catalyst solution comprising 50 ml of methanol, 0.1 mmol of palladium acetate, 1 mmol of para-toluenesulfonic acid, 3 mmol of 2,2'bipyridine and 20 mmol of 1,4-benzoquinone. After removal of the air present by evacuation, vinyl chloride was introduced until a pressure of 4 bar had been reached, followed by carbon monoxide until a pressure 34 bar was reached and ethylene until a pressure of 49 bar was reached. The contents of the autoclave were heated to 90° C. and maintained for 5 hours, after which polymerization was terminated by cooling to room temperature and releasing the pressure. The polymer produced was recovered by filtration, washed with methanol and dried in vacuo at room temperature. A carbon monoxide/ethylene copolymer, 2g, was obtained. No carbon monoxide/ethylene/vinyl chloride terploymer was indcated as being present by $^{13}$C-NMR analysis.

COMPARATIVE EXAMPLE II

To a stirred atutoclave of 250 ml capacity was charged a catalyst solution comprising 30 ml of methanol, 0.1 mmol of palladium acetate, 0.5 mmol of copper para-toluenesulfonate and 0.15 mmol of 1,3-bis(diphenylphosphino)propane. After 30 ml of methyl acrylate had been added, the air present was removed by evacuation and carbon monoxide was added until a pressure of 40 bar was reached. The contents of the autoclave were heated to 90° C. and maintained for 5 hours, after which poymerization was terminated by cooling to room temperatue and releasing the pressure. Only a very small amount of polymer was obtained.

COMPARATIVE EXAMPLE III

A terpolymer of carbon monoxide, ethylene and methyl acrylate was produced by charging to a stirred autoclave of 250 ml capacity a catalyst solution comprising 40 ml of methanol, 0.1 mmol of palladium acetate, 2 mmol of copper p-tosylate (para-toluenesulfonate) and 0.15 mmol of 1,3-bis(diphenylphosphino)propane. After the addition of 20 ml of methyl acrylate, the air present in the autoclave was removed by evacuation. Carbon monoxide was added until a pressure of 25 bar was reached and ethylene was added until a pressure of 50 bar was reached. The contents of the autoclave were heated to 90° C. and maintained for 5 hours. Polymerization was then terminated by cooling to room temperature and releasing the pressure. The polymer was removed by filtration, washed with methanol and dried in vacuo at room temperature. The terpolymer obtained was 8.2g, produced at a calculated rate of 164g terpolymer/g Pd/hr.

ILLUSTRATIVE EMBODIMENT I

A terpolymer of carbon monoxide, ethylene and methyl 10-undecenoate was produced according to the procedure of Comparative Example III except that the autoclave was charged with 30 ml of methyl 10-undecenoate instead of methyl acrylate and the reaction time was 0.5 hour instead of 5 hours. The terpolyer product, 7.1g, was produced at the calculated rate of 1420g of terpolymer/g Pd/hr. By $^{13}$C-NMR analysis it was shown that the polymer was a linear polymer of randomly arranged units of —CO—$C_2H_4$ and —CO—$C_{12}H_{22}O_2$—, present in a ratio of 23:1.

ILLUSTRATIVE EMBODIMENT II

A terpolymer of carbon monoxide, ethylene and 10-undecenoic acid was produced by the procedure of Comparative Example I except that (1) the catalyst solution contained 30 ml of methanol and 30 ml of tetrahydrofuran instead of 50 ml methanol, (b) the autoclave was charged with 20 ml of 10-undecenoic acid instead of vinyl chloride and (c) the reaction time was 1 hour instead of 5 hours. 5.7 grams of terpolymer were obtained. By $^{13}$C-NMR analysis it was shown that the polymer was linear and made up of randomly distributed units of the formula —CO—$C_2H_4$ and —CO—$C_{11}H_{20}O_2$—, present in a ratio of 48:1.

ILLUSTRATIVE EMBODIMENT III

A carbon monoxide/ethylene/6-chlorohexene-1 was produced by the procedure of Comparative Example I, except that the catalyst solution included 10 mmol instead of 20 mmol of 1,4-benzoquinone and the autoclave was charged with 20 ml of 6-chlorohexene-1 instead of vinyl chloride. Terpolymer product was obtained in a quantity of 29g. Buy $^{13}$C-NMR analysis it was shown that the polymer was linear and comprised random units of —OC—$C_2H_4$— and —CO—$C_6H_{11}Cl$— in a ration of 14:1.

ILLUSTRATIVE EMBODIMENT IV

A terpolymer of carbon monoxide, ethylene and allyl acetate was produced by the procedure of Comparative Example I except that (a) the catalyst solution comprised 40 ml instead of 50 ml of methanol, 10 mmol instead of 20 mmol of 1,4-benzoquinone and 2 mmol instead of 1 mmol of p-toluenesulfonic acid, (b) the autoclave was charged with 20 ml of allyl acetate instead of vinyl chloride and (c) the reaction temperature was 65° C. instead of 90° C. A yield of 6.6g of terpolymer was obtained. By $^{13}$C-NMR analysis it was shown that the terpolymer was linear and had randomly distributed units of —CO—$C_2H_4$— and —CO—$C_5H_8O_2$—, present in a ratio of 18:1.

ILLUSTRATIVE EMBODIMENT V

A terpolymer of carbon monoxide, ethylene and 10-undecenyl alcohol was produced by the procedure of Comparative Example III except that (a) a catalyst solution was used which comprised 50 ml of methanol, 0.5 mmol of palladium acetate, 2 mmol of copper p-tosylate and 0.75 mmol of 1,3-bis(diphenylphosphino)propane, (b) the autoclave was charged with 30 ml of 10-undecenyl alcohol instead of methyl acrylate, carbon monoxide until a pressure of 30 bar was reached and ethylene until a pressure of 50 bar was reached and (c) the reaction temperature was 65° C. instead of 90° C. and the reaction time was 0.5 hour instead of 5 hours. 23 grams of terpolymer were obtained which was shown by $^{13}$C-NMR analysis to be linear and have randomly occurring units of —CO—$C_{12}H_4$ and —C—$C_{11}H_{22}O$—, present in a ratio of 20:1.

ILLUSTRATIVE EMBODIMENT VI

A copolymer of carbon monoxide and methyl 10-undecenoate was produced by the procedure of Comparative Example II except that (a) the catalyst solution comprised 30 ml of methanol, 0.5 mmol of copper p-tosylate, and 0.75 mmol of 1,3-bis(diphenylphosphino)propane, (b) the autoclave was charged with 30 ml of methyl 10-undecenoate instead of methyl acrylate and (c) the reaction temperature was 50° C. instead of 90° C. A solution of 11g of the copolymer in methanol was obtained. By $^{13}$C-NMR analysis it was shown that the polymer was linear and made up of units of the formula —CO—$C_{12}H_{22}$O—.

ILLUSTRATIVE EMBODIMENT VII

A copolymer of carbon monoxide and 10-undecenyl alcohol was produced by the procedure of comparative Example II except that (a) the catalyst solution comprised 50 ml of methanol, 0.5 mmol of palladium acetate, 2 mmol of copper p-tosylate and 0.75 mmol of 1,3-bis(diphenylphosphino)propane, (b) the autoclave was charged with 20ml of 10-undecenyl alcohol instead of methyl acrylate and (c) the reaction temperature was 70° C. instead of 90° C. A polymer solution of 8g of copolymer in methanol was obtained. By $^{13}$C-NMR analysis it was shown that the polymer was linear and made up of the units —CO—$C_{11}H_{22}$O—.

What is claimed is:

1. The process of producing linear alternating polymers of carbon monoxide and a functionally substituted ethylenically unsaturated compounds wherein the functional substituent is separated from the ethylenic unsaturation by at least one —$CH_2$— bridging group, by contacting carbon monoxide and the functionally substituted ethylenically unsaturated compound under polymerization conditions in the presence of a catalyst composition formed from a palladium compound, the anion of a non-hydrohalogenic acid having a pKa less than about 6 and a bidentate ligand selected from bidentate phosphorus ligand and bidentate nitrogen ligand.

2. The process of claim 1 wherein the functionally substituted ethylenically unsaturated compound has up to 20 carbon atoms and has the formula $CH_2$=CH—($CH_2$)$_n$—Z wherein n is an integer of at least 1 and Z is hydroxyl, alkoxy, phosphonato, or halo.

3. The process of claim 2 wherein the ligand has the formula

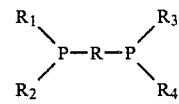

wherein $R_1$, $R_2$, $R_3$ and $R_4$ independently are aryl of 6 to 20 carbon atoms inclusive and R is a divalent hydrocarbyl bridging group of from 2 to 20 carbon atoms inclusive and 2 to 4 carbon atoms in the phosphorus-phosphorus bridge.

4. The process of claim 3 wherein the anion is the anion of trifluoracetic acid or para-toluenesulfonic acid.

5. The process of claim 4 wherein the ligand is 1,3-bis(diphenylphosphino)propane.

6. The process of claim 2 wherein the ligand has the formula

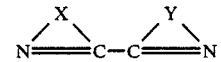

wherein X and Y independently are divalent bridging groups of from 2 to 10 carbon atoms inclusive and up to 2 nitrogen atoms with from 3 to 4 atoms in the bridge at least two of which are carbon and any other atoms in the bridge being nitrogen.

7. The process of claim 6 wherein the anion is the anion of an acid elected from trifluoracetic acid and para-toluensulfonic acid.

8. The process of claim 7 wherein the functionally substituted ethylencially unsaturated compound is 6-chlorohexene-1.

9. The process of claim 8 wherein the ligand is 2,2'-bipyridine.

10. The process of claim 1 wherein ethylenically unsaturated hydrocarbon of up to 15 carbon atoms is additionally present.

11. The process of claim 10 wherein the ethylenically unsaturated hydrocarbon is ethylene.

12. The process of claim 1 wherein the ligand is 1,3-bis(diphenylphosphino)propane.

13. The process of claim 12 wherein the functionally substituted ethylenicaly unsaturated compound is 10-undecenyl alcohol.

* * * * *